Nov. 19, 1935.   R. H. STRAIT   2,021,468
REFRIGERATOR
Filed Feb. 9, 1934
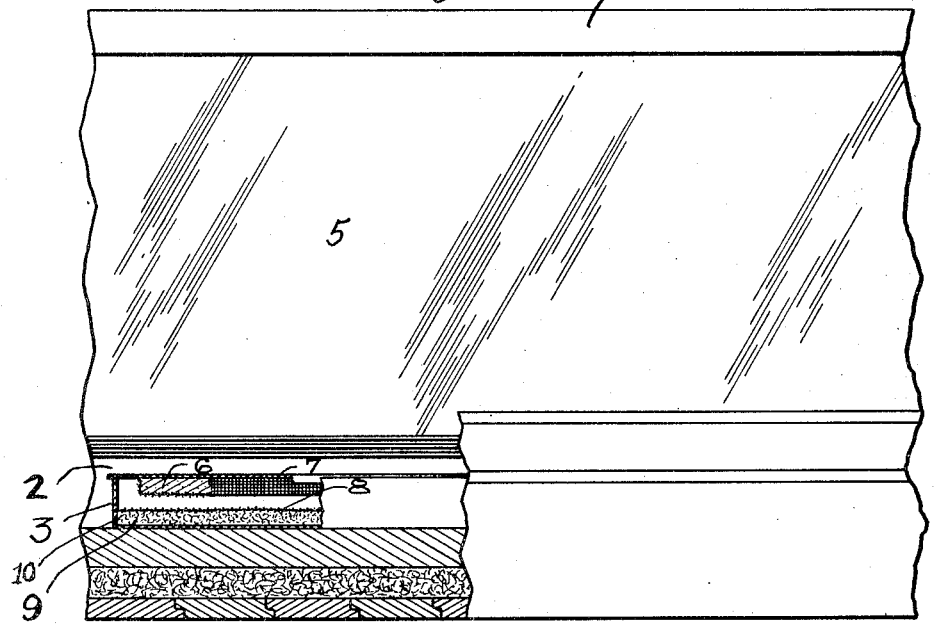
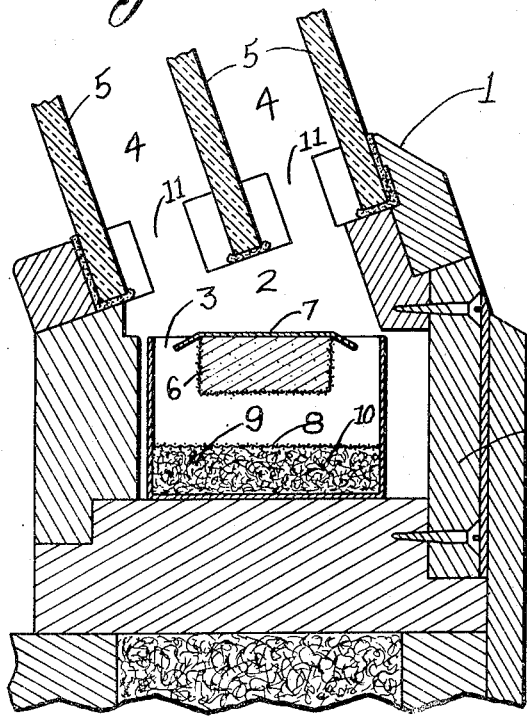
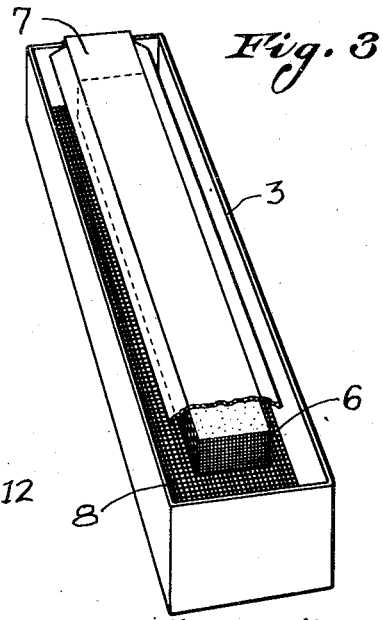

Patented Nov. 19, 1935

2,021,468

UNITED STATES PATENT OFFICE 2,021,468

REFRIGERATOR

Ralph H. Strait, St. Louis, Mo., assignor to Hussmann-Ligonier Company, St. Louis, Mo., a corporation of Delaware Application February 9, 1934, Serial No. 710,477

10 Claims. (Cl. 183—4)

My invention relates to refrigerators and especially to show case refrigerators of the type used to display foodstuffs, in which one or more walls of the case are composed of two or more plates of glass separated from one another so as to form dead air spaces. More particularly my invention relates to a receptacle located within the case and adapted for the reception of chemical substances used as hereinafter described.

In cases of the type referred to air is trapped between the plates of glass included in a wall of the case for the purpose of increasing the heat insulating properties thereof. This method of construction permits a clear view of the contents of the case, provided the glass retains its original transparency. However, there is usually moisture in the air which finds its way into the spaces between the transparent plates and this moisture condenses on the plates and together with other substances in the air attacks the glass to cloud it and seriously impair visibility therethrough. Also, the condensed moisture drops down to the bottom of the panel and soaks into the frame members causing deterioration thereof.

Experiments have shown that by including various chemical bodies in a position to be exposed to the air in the spaces between the transparent plates the moisture and other injurious substances can be removed from the air in such spaces and visibility through the plates will be maintained free and clear.

The object of my invention is to provide a receptacle for such chemical bodies and while its use is not so limited it is particularly adapted for use with metallic sodium, the action of which chemical is fully explained and described in an application for Letters Patent of Alexander L. Duval D'Adrian filed concurrently herewith.

In that application there is described and claimed a method for treating the entrapped air to remove the moisture and other injurious substances, as carbon dioxide, and inasmuch as the invention described and claimed herein covers a type of receptacle suitable for giving the method practical application, I will describe only briefly herein the chemical reactions which occur to effect the desired result. Briefly stated, when the chemical substance employed is metallic sodium, the entrapped air, upon coming into contact with the sodium, forms sodium oxide, and thereupon a second reaction takes place in which the moisture of the air combines with the sodium oxide to form sodium hydroxide which in turn combines with the carbon dioxide in the air to form sodium carbonate, ordinarily referred to as soda ash.

In order to permit of the proper functioning of the method just described, the metallic sodium must be placed so as to have contact with the entrapped air, and provision also must be made for bringing the air into contact with the resulting sodium oxide and sodium hydroxide. The object of my invention is to provide a convenient receptacle, suitable for installation in a show case, in which these objects may be attained.

Referring to the drawing, in which one embodiment of my invention is shown and in which similar numerals are used to designate similar parts in the various figures: Fig. 1 is a partial sectional side view of a case showing a sectional side view of the embodiment of my invention described herewith; Fig. 2 is a sectional view toward the bottom of one wall of the case showing a cross-sectional view of the device; and Fig. 3 is a perspective view of the device proper. Formed in the wall of the case 1, by any suitable method of construction, preferably, though not necessarily, toward the bottom thereof, is an opening, or pocket 2, adapted to receive receptacle 3 composed of any suitable material, for example, sheet metal. The pocket 2 is so constructed that it has connection with the air spaces 4 formed by the plates of glass 5 included in a wall of the case, and this may be effected by slots or other openings 11 formed in the members separating the glass plates. The receptacle 3 is closed on all sides except the top.

Suitably carried by the receptacle 3 is a container 6 having its sides, ends and bottom composed of wire mesh. The container 6 is adapted for the reception of the chemical substance used to treat the air and is covered with a shield or guard 7 constructed as indicated and completely covering the top of the container. The purpose of the shield 7 is to prevent direct contact between the chemical substance and water or other fluid which might otherwise flow thereon from the upper part of the case. Thus, any violent chemical reaction which might occur between the chemical substance and the fluid, such as occurs, for example, when metallic sodium and water are brought together, is effectually prevented. Toward its edges the shield 7 is inclined downwardly from its normal plane so as to shed any moisture which may drop thereon. While the shield 7 is of adequate size to completely cover the container 6, ample space is provided between its edges and the walls of the receptacle 3 to permit the free movement of air from the air spaces 4 into the receptacle 3.

Some distance below the bottom of the container 6 and supported preferably by the ends and side walls of the receptacle 3 is a screen 8 composed of wire mesh, below which, and in the chamber 10 formed thereby, is placed a fibrous material 9, such as asbestos.

It is necessary from time to time to replace the chemical substance and remove the accumulation in the chamber 10 and any suitable means of access to the receptacle may be provided, for example, a detachable panel 12 in the base of the frame, which when removed, will permit the receptacle 3 being withdrawn from its normal position.

The functions performed by the various parts of the embodiment of my invention shown and described herewith can best be explained by the following brief description: Metallic sodium, for example, having been placed in the container 6, the air entrapped in the air spaces 4 flows into the pocket 2 through the slots 11, into the receptacle 3, and comes in contact with the sodium through the openings in the walls of the container 6. Thereupon, through the action of the moisture in the air, sodium oxide, a crystalline substance, is formed on the surface of the sodium. The sodium oxide then combines with the moisture in the air to form sodium hydroxide, which, being deliquescent, liquefies and drops from the container 6 onto and through the screen 8 into the absorbing material 9. This arrangement permits the entrapped air to come into contact with the sodium hydroxide, and the carbon dioxide in the air combines with the sodium hydroxide to form soda ash, which remains in the bottom of the receptacle until removed.

It is to be noted that the progressive chemical reactions which occur require that the substances progressively and continuously being formed shall have free contact, as the reactions occur, with the entrapped air, and it is evident that the device of my invention provides for the disposition of the substances formed so that this result is achieved. It will be apparent, therefore, that I have provided a new and useful improvement in that my invention permits of intimate contact between the air and the substances formed by the reactions referred to, whereby the moisture and other substances are removed from the air.

In any embodiment of my invention the space in the receptacle below the container is large enough to collect and trap the full amount of liquid resulting from reaction or decomposition of the entire charge of chemical used.

I do not intend to limit myself to the particular embodiment shown and described herewith, since it is evident that many changes might be made without departing from the spirit of my invention, which in essence, covers a receptacle having a perforated container suitable for the reception of chemical substances, and provision for maintaining contact between the air entrapped in the walls of the case on the one hand, and the chemical substances in, or formed in the receptacle on the other, whereby moisture and other substances are removed from the air, and clouding of the glass included in the walls of the case is prevented.

What I claim as new and desire to secure by Letters Patent, is:

1. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance, the walls of said container being arranged whereby air in said receptacle may have free access to said chemical substance and means interposed between said glass plates and said chemical substance for preventing direct contact between the latter and any liquid which may drip from the plates.

2. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance and said container having perforated side and bottom walls, whereby air in said receptacle may have free access to said chemical substance, and an imperforate top, whereby direct access of liquid dripping from said glass plates to said chemical substance is prevented.

3. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein and near the top thereof a container arranged to hold a chemical substance, and said container having perforated walls, whereby air in said receptacle may have free access to said chemical substance, and an imperforate top; whereby direct access of liquid dripping from said glass plates to said chemical substance is prevented, said top being provided with downwardly-bent lateral moisture-shedding extensions.

4. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance and said receptacle being adapted and arranged to form a chamber below said container to collect liquids resulting from exposure of said chemical substance to said air, and means interposed between said glass plates and said container for preventing direct contact between said chemical substance and any liquid which may drip from the plates.

5. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance, said container having a perforated wall whereby air in said receptacle may have free access to said chemical substance, an imperforate shield interposed between said container and said glass plates and comprising downwardly-bent moisture-shedding lateral extensions, said receptacle also having a perforated partition positioned to form a chamber below said container, and a fibrous material arranged in said chamber.

6. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance, and a shield covering the top of said container and arranged to prevent liquid from said air space from contacting directly with said chemical substance.

7. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance, and a shield covering the top of said container and extending beyond the walls thereof whereby liquid from said air space will be prevented from coming in direct contact with said chemical substance.

8. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container to hold a chemical substance, said container having perforated walls whereby air in said receptacle may have free access to said chemical substance, and an imperforate shield covering the top of said container whereby liquid from said air space will be prevented from coming in direct contact with said chemical substance.

9. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein and near the top thereof a container arranged to hold a chemical substance, said container having perforated walls whereby air in said receptacle may have free access to said chemical substance, said receptacle also having a perforated partition positioned to form a chamber below said container to collect liquid resulting from exposure of said chemical substance to said air, and an imperforate shield covering the top of said container and extending beyond the walls thereof whereby liquid from said air space will be prevented from coming in direct contact with said chemical substance.

10. In a refrigerator, in combination, a plurality of glass plates arranged to form an air space therebetween, a chamber below and immediately adjacent said spaced plates and adapted to receive liquid dripping from said plates, a receptacle arranged in said chamber and in communication with said air space, said receptacle having therein a container arranged to hold a chemical substance, the walls of said container being arranged whereby air in said receptacle may have free access to said chemical substance and said container being positioned out of contact with the side and end walls of said receptacle.

RALPH H. STRAIT.